United States Patent
Anderson (10) Patent No.: US 8,775,441 B2
(45) Date of Patent: Jul. 8, 2014

(54) MANAGING AN ARCHIVE FOR APPROXIMATE STRING MATCHING

(75) Inventor: Arlen Anderson, Kidlington (GB)

(73) Assignee: Ab Initio Technology LLC, Lexington, MA (US)

( * ) Notice: Subject to any disclaimer, the term of this patent is extended or adjusted under 35 U.S.C. 154(b) by 368 days.

(21) Appl. No.: 12/015,085

(22) Filed: Jan. 16, 2008

(65) Prior Publication Data

US 2009/0182728 A1 Jul. 16, 2009

(51) Int. Cl.
*G06F 17/30* (2006.01)
*G06F 15/16* (2006.01)

(52) U.S. Cl.
USPC .......................................... 707/749; 707/750

(58) Field of Classification Search
USPC ................. 707/802, 999.5, 750, 749
See application file for complete search history.

(56) References Cited

U.S. PATENT DOCUMENTS

| | | | |
|---|---|---|---|
| 5,179,643 A | 1/1993 | Homma et al. | |
| 5,388,259 A | 2/1995 | Fleischman et al. | |
| 5,832,182 A | 11/1998 | Zhang et al. | |
| 6,026,398 A * | 2/2000 | Brown et al. | 1/1 |
| 6,317,707 B1 | 11/2001 | Bangalore et al. | |
| 6,456,995 B1 | 9/2002 | Salo et al. | |
| 6,493,709 B1 * | 12/2002 | Aiken | 1/1 |
| 6,581,058 B1 | 6/2003 | Fayyad et al. | |
| 6,658,626 B1 * | 12/2003 | Aiken | 715/205 |
| 7,043,476 B2 * | 5/2006 | Robson | 1/1 |
| 7,246,128 B2 * | 7/2007 | Jordahl | 1/1 |
| 7,283,999 B1 * | 10/2007 | Ramesh et al. | 1/1 |
| 7,287,019 B2 | 10/2007 | Kapoor et al. | |
| 7,472,113 B1 | 12/2008 | Watson et al. | |
| 7,672,833 B2 * | 3/2010 | Blume et al. | 704/10 |
| 8,032,546 B2 | 10/2011 | Arasu et al. | |
| 8,175,875 B1 | 5/2012 | Dean et al. | |
| 8,195,626 B1 | 6/2012 | Goodwin | |
| 8,433,715 B1 | 4/2013 | Mirhaji | |
| 2002/0002454 A1 | 1/2002 | Bangalore et al. | |
| 2002/0099536 A1 * | 7/2002 | Bordner et al. | 704/10 |

(Continued)

FOREIGN PATENT DOCUMENTS

| EP | 1302873 | 4/2003 | |
|---|---|---|---|
| EP | 1-962-209 A2 * | 8/2008 | G06F 17/30 |

(Continued)

OTHER PUBLICATIONS

Parizeau, Marc, et al., "Optimizing the Cost Matrix for Approximate String Matching Using Genetic Algorithms", Pattern Recognition, vol. 31, No. 4, © 1998, pp. 431-440.*

(Continued)

*Primary Examiner* — Alex Gofman
(74) *Attorney, Agent, or Firm* — Fish & Richardson P.C.

(57) ABSTRACT

In one aspect, in general, a method is described for managing an archive. The archive is used for determining approximate matches associated with strings occurring in records. The method includes processing records to determine a set of string representations that correspond to strings occurring in the records. The method also includes generating, for each of at least some of the string representations in the set, a plurality of close representations that are each generated from at least some of the same characters in the string. The method also includes storing entries in the archive. Each stored entry represents a potential approximate match between at least two strings based on their respective close representations.

45 Claims, 3 Drawing Sheets

(56) References Cited

U.S. PATENT DOCUMENTS

| | | | |
|---|---|---|---|
| 2002/0124015 | A1 | 9/2002 | Cardno et al. |
| 2003/0018652 | A1 | 1/2003 | Heckerman et al. |
| 2003/0033138 | A1 | 2/2003 | Bangalore |
| 2003/0120630 | A1 | 6/2003 | Tunkeland |
| 2003/0182310 | A1 | 9/2003 | Charnock et al. |
| 2004/0015498 | A1* | 1/2004 | Rabaioli ............................ 707/9 |
| 2004/0024720 | A1 | 2/2004 | Fairweather |
| 2004/0036716 | A1* | 2/2004 | Jordahl ........................ 345/713 |
| 2004/0064303 | A1 | 4/2004 | Bangalore et al. |
| 2004/0073534 | A1* | 4/2004 | Robson ............................ 707/1 |
| 2004/0139072 | A1* | 7/2004 | Broder et al. ...................... 707/4 |
| 2004/0249789 | A1 | 12/2004 | Kapoor et al. |
| 2005/0038784 | A1 | 2/2005 | Zait et al. |
| 2005/0120011 | A1* | 6/2005 | Dehlinger et al. ................. 707/3 |
| 2005/0262044 | A1 | 11/2005 | Chaudhuri et al. |
| 2006/0004744 | A1* | 1/2006 | Nevidomski et al. ............. 707/4 |
| 2006/0036593 | A1 | 2/2006 | Dean et al. |
| 2006/0059173 | A1* | 3/2006 | Hirsch et al. .................. 707/100 |
| 2006/0059207 | A1* | 3/2006 | Hirsch et al. .................. 707/201 |
| 2006/0253418 | A1 | 11/2006 | Charnock et al. |
| 2007/0112714 | A1 | 5/2007 | Fairweather |
| 2007/0156614 | A1 | 7/2007 | Flinn et al. |
| 2007/0239741 | A1* | 10/2007 | Jordahl ........................ 707/100 |
| 2008/0040342 | A1 | 2/2008 | Hust et al. |
| 2008/0140653 | A1 | 6/2008 | Matzke et al. |
| 2008/0162533 | A1 | 7/2008 | Mount et al. |
| 2008/0249999 | A1 | 10/2008 | Renders et al. |
| 2009/0055380 | A1 | 2/2009 | Peng et al. |
| 2009/0171955 | A1* | 7/2009 | Merz et al. ......................... 707/6 |
| 2009/0182728 | A1 | 7/2009 | Anderson |
| 2009/0234826 | A1* | 9/2009 | Bidlack ............................. 707/5 |
| 2009/0319518 | A1 | 12/2009 | Koudas et al. |
| 2009/0327320 | A1 | 12/2009 | Yan et al. |
| 2010/0067745 | A1 | 3/2010 | Kovtun et al. |
| 2010/0106724 | A1 | 4/2010 | Anderson |
| 2010/0169299 | A1 | 7/2010 | Pollara |
| 2010/0169311 | A1 | 7/2010 | Tengli et al. |
| 2010/0268724 | A1* | 10/2010 | Nevidomski et al. ......... 707/759 |
| 2010/0274770 | A1 | 10/2010 | Gupta et al. |
| 2010/0274785 | A1 | 10/2010 | Procopiuc et al. |
| 2010/0281036 | A1 | 11/2010 | Inoue et al. |
| 2010/0332456 | A1 | 12/2010 | Prahlad et al. |
| 2011/0029536 | A1 | 2/2011 | Knight et al. |
| 2011/0113032 | A1 | 5/2011 | Boscolo et al. |
| 2011/0153577 | A1 | 6/2011 | Dean et al. |
| 2011/0213974 | A1 | 9/2011 | Ardon et al. |
| 2011/0302168 | A1 | 12/2011 | Aggarwal |
| 2012/0072421 | A1 | 3/2012 | Bhattacharya et al. |
| 2012/0158696 | A1 | 6/2012 | Arasu et al. |
| 2012/0209808 | A1 | 8/2012 | Tien et al. |
| 2013/0124524 | A1 | 5/2013 | Anderson |
| 2013/0297635 | A1 | 11/2013 | Bayliss |

FOREIGN PATENT DOCUMENTS

| | | |
|---|---|---|
| JP | H02-129756 | 5/1990 |
| JP | H06-044309 | 2/1994 |
| JP | H09-044518 | 2/1997 |
| JP | 10275159 | 10/1998 |
| JP | 11184884 | 7/1999 |
| JP | 2003-006226 | 1/2003 |
| WO | WO 01/31479 | 5/2001 |
| WO | WO2005/073881 | 8/2005 |
| WO | WO 2006/102227 | 9/2006 |

OTHER PUBLICATIONS

Chaudhuri, Surajit, et al., "Robust and Efficient Fuzzy Match for Online Data Cleaning", SIGMOD 2003, San Diego, CA, Jun. 9-12, 2003, pp. 313-324.*

Atallah, M. J., et al., "A Randomized Algorithm for Approximate String Matching", Algorithmica, vol. 29, Springer-Verlag, New York, NY, © 2001, pp. 468-486.*

Marzal, Andrés, et al., "Speeding Up the Computation of the Edit Distance for Cyclic Strings", Proc. of the 15th International Conf. on Pattern Recognition, Barcelona, Spain, Sep. 3-7, 2000, pp. 891-894.*

"Inverse (mathematics)", Wikipedia, downloaded from: en.wikipedia.org/wiki/Inverse_(mathematics), Apr. 5, 2010, 1 page.*

Navarro, Gonzalo, et al., "Compressed Full-Text Indexes", ACM Computing Surveys (CSUR), vol. 39, Issue 1, Apr. 2007, pp. 1-66.*

Gu, Lifang, et al., "Adaptive Filtering for Efficient Record Linkage", Proc. of the 4th SIAM International Conf. on Data Mining, Lake Buena Vista, FL, Apr. 22-24, 2004, pp. 477-481.*

Buss, Samuel R., et al., "A Bipartite Matching Approach to Approximate String Comparison and Search", CiteseerX—Scientific Digital Library and Search Engine, © 1995, pp. i and 1-19.*

Microsoft Computer Dictionary, Microsoft Press, Redmond, WA, © 2002, p. 446.*

Baeza-Yates, Ricardo, et al., "Fast and practical approximate string matching", Information Processing Letters, vol. 59, Issue 1, Jul. 8, 1996, pp. 21-27.*

Monge, Alvaro E., et al., "An efficient domain-independent algorithm for detecting approximate duplicate database records", CiteSeer, © 1997, pp. 1-7.*

Ananthakrishna, Rohit et al., "Eliminating Fuzzy Duplicates in Data Warehouses." *Proceedings of the 28th VLDB Conference*, Hong Kong, China, 2002. 12 pages.

Bocek, Thomas et al., "Fast Similarity Search in Large Dictionaries." *Technical Report, Department of Informatics, University of Zurich*, Apr. 2007. 32 pages.

Du, Mengmeng, "Approximate Name Matching." Master's Thesis in Computer Science at the School of Computer Science and Engineering, Royal Institute of Technology, Stockholm, Sweden, 2005. 55 pages.

Gravano, Luis et al., "Approximate String Joins in a Database (Almost) for Free." *Proceedings of the 27th VLDB Conference*, Roma, Italy, 2001. 10 pages.

Navarro, Gonzalo, "A Guided Tour to Approximate String Matching." *ACM Computing Surveys*, vol. 33, No. 1, Mar. 2001. pp. 31-88.

Navarro, Gonzalo et al., "Indexing Methods for Approximate String Matching." *IEEE Data Engineering Bulletin*, 24 (4), 2001. pp. 19-27.

Yamamoto, Eiko, "Dynamic Programming Matching for Large Scale Information Retrieval." *In Proceedings of the Sixth International Workshop on Information Retrieval with Asian Languages*, 2003. pp. 100-108.

Zadeh, L.A., "Fuzzy Sets." *Information and Control 8*, 1965. pp. 338-353.

International Search Report and Written Opinion issued in PCT application No. PCT/US2009/061899, mailed Mar. 16, 2010, 13 pages.

Pedrycz, Witold et al. "Fuzzy Systems Engineering Toward Human-Centric Computing," IEEE Press, Hoboken, New Jersey, Wiley & Sons, Inc. 2007. 549 pages.

Hassanzadeh, Oktie, et al., "Accuracy of Approximate String Joins Using Grams," VLDB '07, Sep. 23-28, 2007, 8 pages.

Supplementary European Search Report, EP 08870601, dated Jul. 16, 2012, 7 pages.

Winkler, William E., "Frequency-Based Matching in Fellegi-Sunter Model of Record Linkage." Bureau of the Census Statistical Research Division, Statistical Research Report Series No. RR2000/06, issued Oct. 4, 2000, 14 pages.

Heller, Katherine A. et al., "Statistical Models for Partial Membership," Engineering Department, University of Cambridge, Cambridge, UK, copyright 2008, 8 pages.

Abdule-Wahab, Rasha S., et al., "New Directions to Improve Clustering with a Scatter Search Based Algorithm." Technical Report 283—Laboratoire d'Informatique, 2005, 4 pages.

Cohen, William, et al., "Learning to Match and Cluster Entity Names." In ACM SIGIR-2001 Workshop on Mathematical/Formal Methods in Retrieval, 2001, 9 pages.

De Vries, Timothy et al., "Robust Record Linkage Blocking Using Suffix Arrays." CIKM'09, Nov. 2-6, 2009, 10 pages.

Ester, Martin, et al., "Incremental Clustering for Mining in a Data Warehousing Environment," Proceedings of the 24th VLDB Conference, USA, 1998, 11 pages.

(56) References Cited

OTHER PUBLICATIONS

Hylton, Jeremy, "Identifying and Merging Related Bibliographic Records." Master's Degree Thesis, MIT, Jun. 1996, 99 pages.
IQ Associates, "Typical Match Merge Process Flowchart." 2009, 1 page.
Jain, A.K., et al., "Data Clustering: A Review." ACM Computing Surveys, vol. 31, No. 3, Sep. 1999, pp. 264-323.
Kim, Hung-sik, et al., "HARRA: Fast Iterative Hashed Record Linkage for Large-Scale Data Collections." EDBT 2010, Mar. 22-26, 2010, Lausanne, Switzerland, 12 pages.
Lewis, David D., et al., "RCV1: A New Benchmark Collection for Text Categorization Research." Journal of Machine Learning Research 5 (2004), pp. 361-397.
McCallum, Andrew, et al., "Efficient Clustering of High-Dimensional Data Sets with Application to Reference Matching." KDD 2000, Boston, MA, pp. 169-178.
Medvedev, Timofey, et al., "Company Names Matching in the Large Patents Dataset." Hewlett-Packard Development Company, L.P, Jul. 21, 2011, 7 pages.
Sahoo, Nachiketa, et al., "Incremental Hierarchical Clustering of Text Documents." CIKM'06, Nov. 5-11, 2006, pp. 357-366.
Talend White Paper, "Matching Technology Improves Data Quality." 2010, 18 pages.
Whang, Steven, et al., "Entity Resolution with Iterative Blocking." SIGMOD'09, Jun. 29-Jul. 2, 2009, 13 pages.
Young, Steven, et al., "A Fast and Stable Incremental Clustering Algorithm." Seventh International Conference on Information Technology, Apr. 12-14, 2010, 6 pages.
International Search Report and Written Opinion issued in PCT application No. PCT/US2012/065265, mailed Feb. 18, 2013, 12 pages.
Japanese Office Action, with English translation, application No. 2010-543117, mailed Feb. 4, 2013, 18 pages.
International Search Report, PCT Application, PCT/US2012/065249, mailed Mar. 12, 2013, 12 pages.
International Search Report, PCT Application, PCT/US2012/065255, mailed Mar. 12, 2013, 12 pages.
Zorilla, M.E., et al., "Vertical Partitioning Algorithms in Distributed Databases," Jan. 1, 2007, Computer Aided Systems Theory—Eurocast '99 Lecture Notes in Computer Science, pp. 465-474.
Transaction History, U.S. Appl. No. 12/605,007, Jul. 11, 2013, 3 pages.
Transaction History, U.S. Appl. No. 13/747,669, Jul. 11, 2013, 1 page.
Transaction History, U.S. Appl. No. 13/677,991, Jul. 11, 2013, 1 page.
Transaction History, U.S. Appl. No. 13/678,038, Jul. 11, 2013, 1 page.
Transaction History, U.S. Appl. No. 13/678,078, Jul. 11, 2013, 1 page.
Japanese Office Action, with English translation, application No. 2010-543117, mailed Nov. 6, 2013, 6 pages.
Japanese Office Action, with English translation, application No. 2011-533380, mailed Oct. 10, 2013, 7 pages.
Khan, Shehroz S. and Amir Ahmad, "Cluster Center Initialization Algorithm for K-means Clustering," Pattern Recognition Letters 25 1293-1302 (2004).

* cited by examiner

MANAGING AN ARCHIVE FOR APPROXIMATE STRING MATCHING

BACKGROUND

The invention relates to managing an archive for approximate string matching.

Various techniques for approximate string matching (also called "fuzzy" or "inexact" string matching or searching) are used for finding strings that match a given pattern string within some tolerance according to a string metric (also called a "similarity function"). The strings being searched may be substrings of a larger string called a "text" or may be strings contained in records of a database, for example. One category of string metric is the "edit distance." An example of an edit distance is the Levenshtein distance, which counts the minimum number of edit operations (insertion, deletion, or substitution of a character) needed to convert one string into another. Approximate string matching includes on-line matching, in which the text to be searched cannot be processed (or "indexed") before the matching begins, and off-line matching, in which the text can be processed before the matching begins.

SUMMARY

In one aspect, in general, a method is described for managing an archive for determining approximate matches associated with strings occurring in records. The method includes: processing records to determine a set of string representations that correspond to strings occurring in the records; generating, for each of at least some of the string representations in the set, a plurality of close representations that are each generated from at least some of the same characters in the string; and storing entries in an archive that each represent a potential approximate match between at least two strings based on their respective close representations.

Aspects can include one or more of the following features.

Each string representation comprises a string.

Each close representation consists of at least some of the same characters in the string.

Generating the plurality of close strings for a given string in the set includes generating close strings that each have a different character deleted from the given string.

Generating the plurality of close strings for a given string in the set includes generating close strings that each have a single character deleted from the given string.

Generating the plurality of close strings for a given string in the set includes generating close strings at least some of which have multiple characters deleted from the given string.

Generating close strings that each have a different character deleted from the given string includes generating close strings that each have a single character deleted from the given string if the given string is shorter than a predetermined length, and generating close strings at least some of which have multiple characters deleted from the given string if the given string is longer than the predetermined length.

The method further includes determining, for each of at least some of the string representations in the set, a frequency of occurrence of the corresponding string in the records.

The method further includes generating, for each of at least some of the string representations in the set, a significance value that represents a significance of the corresponding string based on a sum that includes the frequency of occurrence of the string and the frequencies of occurrence of at least some strings represented in the archive as a potential approximate match to the string.

The significance value is generated based on an inverse of the sum.

The method further includes determining whether different phrases that include multiple strings correspond to an approximate match by determining whether strings within the phrases correspond to an approximate match, wherein the strings within the phrases are selected based on their corresponding significance values.

The significance value of a string within a phrase is based on the sum, and is based on least one of a length of the string, a position of the string in the phrase, a field of a record in which the string occurs, and a source of a record in which the field occurs.

The method further includes generating, for each of at least some of the entries in the archive, a score associated with the entry that quantifies a quality of the potential approximate match between at least two strings.

The method further includes determining whether strings associated with an entry correspond to an approximate match by comparing the score associated with the entry to a threshold.

The score is based on a correspondence between the respective close representations used to determine the potential approximate match between the at least two strings.

Processing the records to determine a set of string representations that correspond to strings occurring in the records includes modifying a string occurring in at least one record to generate a modified string to include in the set of string representations.

Modifying the string includes removing or replacing punctuation.

Modifying the string includes encoding the string into a different representation.

Modifying the string includes encoding the string into a numerical representation.

Encoding the string into a numerical representation includes mapping each character in the string to a prime number and representing the string as the product of the prime numbers mapped to the characters in the string.

The archive includes at least some entries that represent a potential approximate match between at least two strings based on input from a user.

In another aspect, in general, a computer program, stored on a computer-readable medium, is described for managing an archive for determining approximate matches associated with strings occurring in records. The computer program includes instructions for causing a computer to: process records to determine a set of string representations that correspond to strings occurring in the records; generate, for each of at least some of the string representations in the set, a plurality of close representations that are each generated from at least some of the same characters in the string; and store entries in an archive that each represent a potential approximate match between at least two strings based on their respective close representations.

In another aspect, in general, a system is described for managing an archive for determining approximate matches associated with strings occurring in records. The system includes: means for processing records to determine a set of string representations that correspond to strings occurring in the records; means for generating, for each of at least some of the string representations in the set, a plurality of close representations that are each generated from at least some of the same characters in the string; and means for storing entries in an archive that each represent a potential approximate match between at least two strings based on their respective close representations.

In another aspect, in general, a system is described for managing an archive for determining approximate matches associated with strings occurring in records. The system includes: a data source storing records; a computer system configured to process the records in the data source to determine a set of string representations that correspond to strings occurring in the records, and generate, for each of at least some of the string representations in the set, a plurality of close representations that are each generated from at least some of the same characters in the string; and a data store coupled to the computer system to store an archive including entries that each represent a potential approximate match between at least two strings based on their respective close representations.

Aspects can have one or more of the following advantages.

In typical database applications, given fields of different records match when their contents are identical. Operations like join and rollup typically group records into sets based on matching keys occurring in specified fields. In some applications, however, it is useful to be able to perform a join or rollup using approximate string matching to compare keys. Two records are said to be an approximate match if their corresponding key fields are sufficiently close under a predetermined criterion. For example, when the operation is being performed using more than one data source, for keys consisting of a word or phrase, the exact spelling of words in each source may not agree or one phrase may contain words not present in the other.

An archive is maintained to store close pairs of strings appearing within records of one or more data sources. These pairs and associated information such as scores provided by the archive increase the efficiency of join, rollup, and other operations that use approximate string matching. In some implementations, the archive is accessible from a component of a computation graph that performs the operations on the data from the data sources, as described in more detail below.

Other features and advantages of the invention will become apparent from the following description, and from the claims.

DESCRIPTION

1 System Overview

The techniques for approximate string matching (or "fuzzy matching") can be applied to a variety of types of systems including different forms of database systems storing datasets. As used herein, a dataset includes any collection of data that enables portions of data to be organized as records having values for respective fields (also called "attributes" or "columns"). The database system and stored datasets can take any of a variety of forms, such a sophisticated database management system or a file system storing simple flat files. One aspect of various database systems is the type of record structure it uses for records within a dataset (which can include the field structure used for fields within each record). In some systems, the record structure of a dataset may simply define individual text documents as records and the contents of the document represent values of one or more fields. In some systems, there is no requirement that all the records within a single dataset have the same structure (e.g., field structure).

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS, incorporated herein by reference. One approach to executing a graph-based computation is to execute a number of processes, each associated with a different vertex of the graph, and to establish communication paths between the processes according to the links of the graph. For example, the communication paths can use TCP/IP or UNIX domain sockets, or use shared memory to pass data between the processes.

Figure 1:
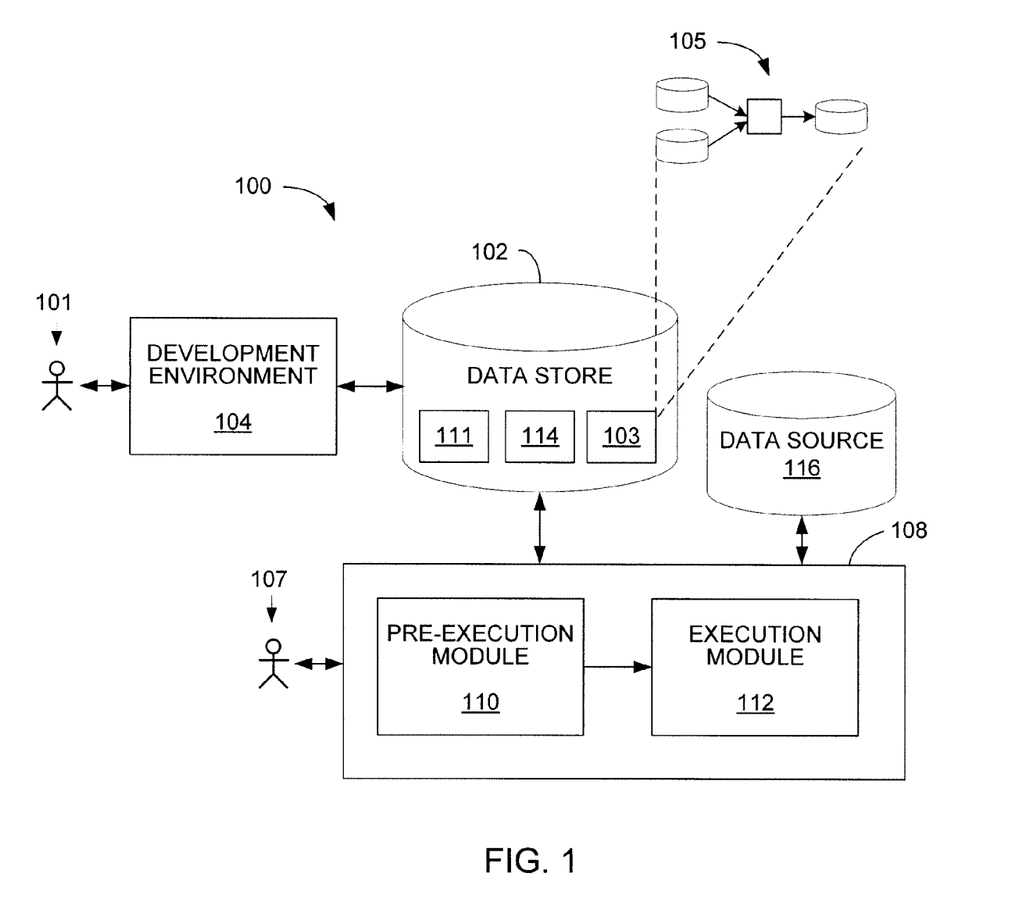
FIG. 1 is a block diagram of a system for executing graph-based computations.

Referring to FIG. 1, a system 100 for executing graph-based computations includes a development environment 104 coupled to a data store 102 and a runtime environment 108 coupled to the data store 102. A developer 101 builds applications using the development environment 104. An application is associated with one or more computation graphs specified by data structures in the data store 102 which may be written to the data store as a result of the developer's use of the development environment 104. A data structure 103 for a computation graph 105 specifies, for example, the vertices (components or datasets) of a computation graph and links (representing flows of work elements) between the vertices. The data structures can also include various characteristics of the components, datasets, and flows of the computation graphs (also called "dataflow graphs").

The runtime environment 108 may be hosted on one or more general-purpose computers under the control of a suitable operating system, such as the UNIX operating system. For example, the runtime environment 108 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The runtime environment 108 is configured to receive control inputs from the data store 102 and/or from a user 107 for executing and configuring computations. The control inputs can include commands to process particular datasets using corresponding computation graphs, which are specified in the stored graph data structures. The user 107 can interact with the runtime environment 108, for example, using a command line or graphical interface.

The runtime environment 108 includes a pre-execution module 110 and an execution module 112. The pre-execution module 110 performs any pre-processing procedures and prepares and maintains resources for executing computation graphs, such as a dictionary 111 and an archive 114 used for approximate string matching. The dictionary 111 stores words and associated information about words appearing in a dataset. The archive 114 stores various results from pre-processing based on words, phrases, or records of the dataset. The dictionary 111 and archive 114 can be implemented in any of a variety of formats and can be organized as single collections of data or as multiple dictionaries and archives. The execution module 112 schedules and controls execution of the processes assigned to a computation graph for performing the computations of the components. The execution module 112 can interact with external computing resources coupled to the system 100 that are accessed during processing associated with the graph components, such as a data source 116 providing records from a database system.

Figure 2:
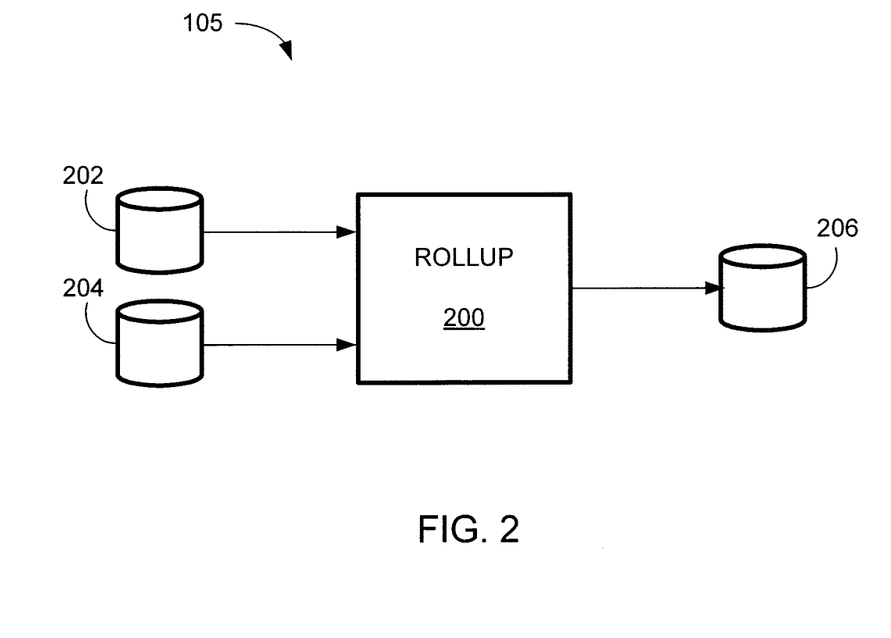
FIG. 2 is a diagram of a computation graph.

Referring to FIG. 2, a simple example of a computation graph 105 includes a rollup component 200 that performs a rollup operation, a first input dataset 202, a second input dataset 204, and an output dataset 206. The input datasets provides flows of work elements (e.g., database records) to the rollup component 200, and the output dataset 206 receives a flow of work elements (e.g., aggregated database records) generated by the rollup component 200. The input datasets 202 and 204 and the output dataset 206 represent stored data (e.g., database files) in a storage medium accessible to the runtime environment 108 such as the data source 116. The rollup component 200 compares key field values of the records received from the input datasets and generates aggregated records based on approximate matches between the key field values.

Figure 3:
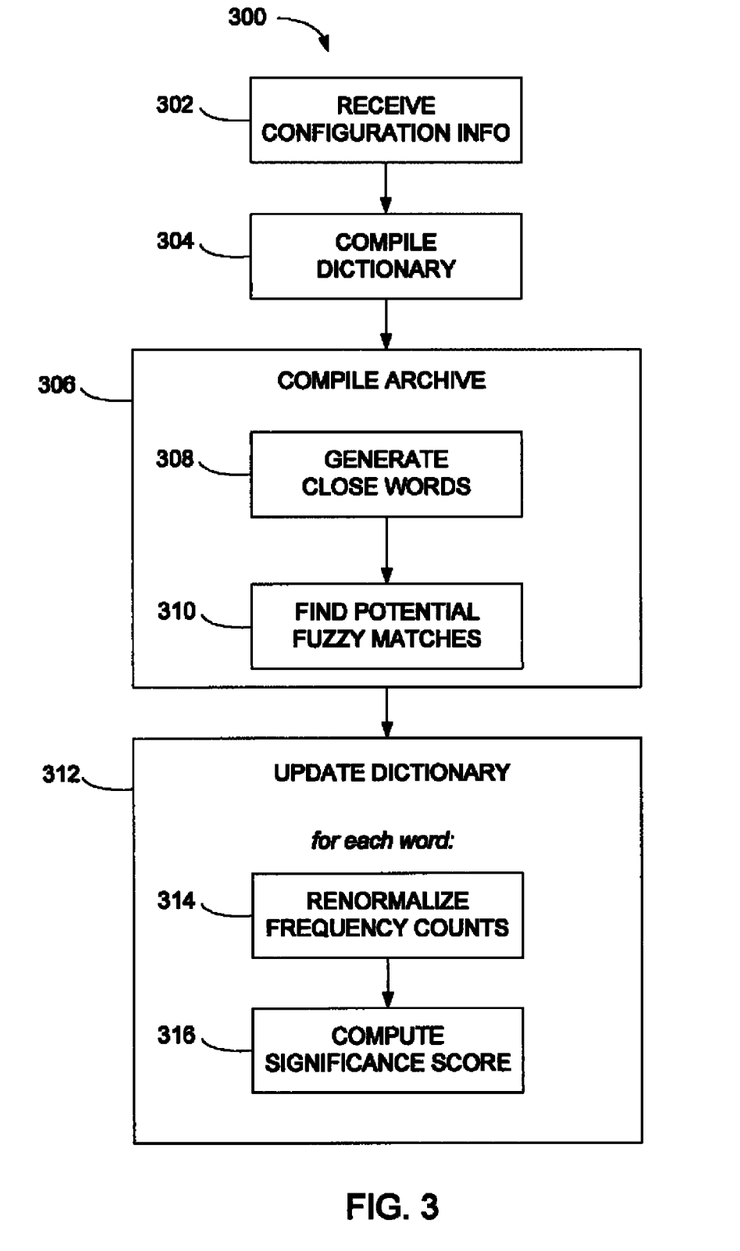
FIG. 3 is a flowchart of a pre-processing procedure.

FIG. 3 shows a pre-processing procedure 300 performed by the pre-execution module 110 to prepare the dictionary 111 and archive 114 used by the computation graphs. The procedure 300 receives (302) configuration information from a user indicating which sources are to be processed and from which fields of those sources words are to be read. The indication of which fields to read may be implicit, according to a default setting, e.g., to read all fields. The procedure 300 compiles (304) the dictionary 111 by reading the selected fields of the records of the selected source(s) and storing the words that appear in the fields in the dictionary, updating statistics such as word frequency counts. The procedure 300 compiles (306) potential fuzzy matches to be stored in the archive 114 by generating (308) close words for the words in the dictionary and finding (310) potential fuzzy matches according to comparison of respective close words. Along with a pair of words that are a potential fuzzy match, a score is stored that can be used during graph execution to determine whether the potential fuzzy match is an actual fuzzy match. The procedure 300 updates (312) the dictionary 111 by computing significance scores for the words appearing in the dictionary 111 based on results stored in the archive 114. For example, for each word in dictionary 111, the procedure 300 renormalizes (314) the word frequency counts based on potential fuzzy matches, as described in more detail below. These renormalized word frequency counts can then be used to compute (316) a significance score that can be used when matching phrases and records of the source.

In some implementations, the pre-processing procedure 300 is repeated each time a new source is available, or new records are received into an existing source. The procedure can be invoked by a user, or automatically invoked at repeated intervals or in response to certain events.

2 Fuzzy Matching

A challenge facing many businesses is to reconcile two (or more) datasets using fields, like "name" or "address," having equivalent values that may not be exactly the same. Reconciling the datasets may involve answering various questions about the data such as the following. Is a company name in one dataset present in another? If so, do they have the same address? If the company names from the two datasets are exactly the same, the corresponding address fields can be compared using a join operation, which finds all records having a matching key (here, the company name). But what if the names are not exactly the same? One name might end with the word COMPANY while another abbreviates it to CO and a third simply drops it altogether. Articles like OF or THE may be in one name but not in another. Words might be misspelled (e.g., COMPNY for COMPANY). The name in one source might contain additional information like the personal name of a contact, or an account number.

There are no firm formatting rules for something like a business name, even within a single dataset, let alone among datasets of different provenance. The challenge is to find a match, generally a set of possible matches, even when the names are not identical. Such matching can be performed using approximate string matching, also known as "fuzzy" matching. The matches are fuzzy because they are tolerant of errors or discrepancies.

When an operation uses fuzzy matching, two words or phrases are said to match if they are found to be equivalent, though not necessarily identical, within some range of acceptable differences or discrepancies. For example, the exact spelling of the words may not agree or one phrase may contain words not present in the other. A score can be used to quantify the quality of the agreement. With fuzzy matching it possible to perform familiar operations such as comparison, join, rollup, and lookup when the keys that would correspond to a match in given fields of records are not necessarily identical but are equivalent.

To increase the speed of fuzzy matching, the pre-execution module 110 periodically processes datasets from data sources that have been identified as potentially accessible by computation graphs. The pre-execution module 110 reads data appearing within selected fields of records of the datasets. The user can select all available fields to be processed or a selected subset of the available fields. In some cases, the data in a field may correspond to a single word, and in some cases the data may correspond to a phrase containing multiple words. (As used herein, a "word" is any string comprising a sequence of characters from some character set, where multiple words in a phrase are separated by spaces or other delimiters such as commas.) Rules for decomposing a field into words are configurable and the rules can be specified when the field is initially selected. In some cases, a phrase with multiple words can be processed in a similar manner as a single word even though there are embedded spaces (e.g., city names or UK postcodes) by decomposing the phrase into a "multi-word" that treats embedded spaces as characters, as described in more detail below. This allows concatenated and broken words to be identified under fuzzy matching. For example, "john allen" would match "johnallen" or even "johnal len".

The pre-execution module 110 identifies a set of words occurring in the records and stores representations of the words (also called "word representations" or "string representations") in the dictionary 111. Statistics for each word can also be stored in the dictionary 111. For example, a frequency of occurrence of a word in the records of a given dataset, or of all the datasets, can be stored in the dictionary 111. Information about the context of a word can be stored in the dictionary 111. For example, the context can include a field or group of fields in which the word occurred. Other information about a word, such as statistics on its position within a phrase, can also be stored in the dictionary 111. The representation of a word can be the word itself, or an encoded representation of the word that is in a different form such as a different character set or in a non-string representation (e.g., a number or alphanumeric encoding), as described in more detail below.

The processing of the pre-execution module 110 includes generating, for a given word, a set of "close words" (or "close representations"). The close words for a given word are stored in the dictionary 111 in association with the given word. The close words are used to generate potential fuzzy matches between pairs of words, as described in more detail below.

The results of the processing are stored in the archive 114 for use by graphs executed by the execution module 112. Some graphs may use the archive 114 in the process of determining whether given records should be processed (e.g., in a join or rollup component). Measuring the similarity of records is a data quality activity that arises in many contexts. For example, two sources may share a common key that is used in a join operation to bring records together from both sources. The fields in the records in which the key may occur need to be compared. Multiple words may be present in a field and often multiple fields are used to hold certain kinds of data, like a name or address. The placement of words among fields may not be consistent across sources, extra words may be present in one source or the other, words may be out of order, and there may be typographical errors. Various scoring functions can be used to compute a base score characterizing a quality of match between records, which is then weighted by penalties for various kinds of inconsistencies and errors. The weights associated with different kinds of errors are adjustable, and the contributions of each penalty to the score for any comparison are reportable. The scoring functions differ by how they compare words for being a fuzzy match and whether they weight words (statistically) in computing the score. Scores for records can involve weighted scoring across several separately scored individual or concatenated fields.

There are three levels of scoring in the matching process: words, phrases and records. Scoring of words is typically done during a pre-processing stage and determines whether two words are a potential fuzzy match or not based on a predetermined criterion and associates the potential fuzzy match with a "fuzzy match score." Scoring of phrases may take into account not only fuzzy matched words, but also the possibility that words are missing from one or both phrases, that words occur out of order or with extra words between them. The scoring algorithms are configurable so that the importance of different sources of discrepancy can be adjusted. The third level of scoring is of entire records. These are scored by combining the scores of different fields in a context-sensitive fashion. Missing or inconsistent information can be given appropriate weight.

The archive 114 stores the pairs of words found to be a potential fuzzy match along with the corresponding fuzzy match score. The set of potential fuzzy matches and their fuzzy match scores can be modified by users to replace the computed fuzzy match score with a different fuzzy match score and to add pairs of potentially fuzzy matching words not related by the predetermined criterion.

The archive 114 also stores a "significance score" that represents the relative importance of a word to a phrase containing the word for the purposes of phrase comparison. The significance score uses the inverse frequency of occurrence of a word in the dataset, but adjusts this value using a frequency of variants related by fuzzy match (determined using the score archive), and optionally uses additional information deduced from length of word, position in the phrase, source, and context (e.g., field where word occurs). Adjusting the significance score based on the context in which a word occurs may be useful, for example, because data may not be placed in the correct field and such errors may need to be identified. In some cases the strings occurring in fields, like an address field, may be received in an unstructured format, but may nevertheless contain structure. These strings can be parsed and individual elements identified. Relative significance by context can be used to indicate whether a given word is more likely to appear in one context or another. For example, in an address field, LONDON as a city instead of part of a street name. Coordination of contextual information assists parsing: if LONDON is followed by another city name, it is likely to be part of a street name; if it immediately precedes the zip code, it is likely the city.

In some implementations, the archive 114 stores a "phrase comparison score" that measures the fuzzy match quality between two phrases. The pre-execution module 110 overlaps phrases to find lists of shared and unused words and uses their relative significance, alignment and word order to compute the phrase comparison score.

The information stored in the archive 114 can be further processed in a variety of ways after it is generated. For example, within the score archive, probable false positives can be identified using the results of self-scoring of gold reference data and possibly ruled out by n-gram analysis applied during the initial scoring. Other scores can also be included. For example, words or phrases from multiple fields can be scored independently and their scores combined to score a full record.

The archive 114 is accessed by different kinds of operations that use a fuzzy match. Some operations include a "normal version" that uses an exact match, and a "fuzzy version" that uses a fuzzy match. A fuzzy version of a rollup (or aggregation) operation associates similar records into groups. This is useful for consolidating records where variant forms of the keys identifying a unique entity are present in the raw data. Simply defining the groups of records associated with the unique entities may be a significant result. Once the groups have been defined, typical aggregation activities are then supported. Because fuzzy match is a scored equivalence relation, association to a group will also be scored. This has the effect that, contrary to the familiar case, a given entity will not necessarily be a member of a unique group. Aggregations (like numeric totals) over the members of a group will not then be exact but will only be known within error bounds reflecting the uncertainty of group membership. Aggregation across all groups will however remain exact because membership in the whole is certain.

Components can also use the score archive to identify misspellings and other errors in individual words. The identified errors could be confirmed by a user (e.g., from a list produced from the archive), and a data correction component could correct the errors in the data. This error correction capability based on fuzzy matches can be an extension to data profiler capabilities, as described in more detail in U.S. patent application Ser. No. 10/941,402 entitled "Data Profiling," incorporated herein by reference.

2.1 Matching Criterion

Any of a variety of criteria can be used to measure of the quality of a match. Consider two words, MOORGATE and MOOGRATE. One type of criterion is a distance metric. There are a number of different distance metrics, or ways to measure a distance, between two words. One of the simplest is the Hamming distance, which counts the number of positions for which the corresponding characters are different. Since this number depends on alignment, the alignment for which the Hamming distance is minimum is used. This corresponds to the minimum number of substitutions required to convert one word to the other, as shown in the following example.

M O O R G A T E
M O O G R A T E

In this example, there are two positions for which corresponding characters differ, requiring two substitutions to convert one word to the other.

Since alignment is important in computing the Hamming distance, an insertion that "breaks" the alignment can produce a large distance, as in the following example.

M O O R G A T E
M O O R G R A T E

In this example, a single insertion in the original word produced a Hamming distance of four. For some applications, the Hamming distance overstates the significance of an insertion.

An alternative to the Hamming distance is the "edit distance." The edit distance is a count of the minimum number of edits (where an "edit" is one of insertion, deletion, or substitution) needed to convert one word into the other, preserving alignment as much as possible. The pair of words MOORGATE and MOOGRATE has an edit distance of 2 because it requires one insertion and one deletion (or two substitutions) to convert one word into the other. The pair of words MOORGATE and MOORGRATE has an edit distance of 1 because it requires one insertion to convert one word into the other.

There are various algorithms for computing the edit distance. By assigning different weights to insertion, deletion and substitution (and even transposition), the edit distance score can be made to reflect the importance of the different kinds of errors. A complication with the edit distance is that it is generally more expensive to compute than the Hamming distance.

A "close word comparison" is an alternative to the edit distance described above, and is fast to compute. Since the frequency of typographical and transcription errors is relatively low in real data, finding more than one error in a single word is rare. (Of course, more systematic errors such as replacing one syllable with a phonetically similar one can involve multiple letters, but these can be treated as non-matching words.) Instead of computing an edit distance between two given words, the pre-execution module 110 uses a "deletion-join" procedure to implement the close word comparison to determine whether or not the given words are a potential fuzzy match. The deletion-join procedure starts by constructing all variant words obtained by deleting a single character from each word to obtain a set of close words called "deletion variants" for each word. The deletion-join procedure then compares the two sets of deletion variants to find whether any of the deletion variants match. If they do, the original words are designated as potential fuzzy match. The deletion-join procedure can be characterized as finding words related by a limited set of equivalent changes involving a single deletion, a single insertion, or a deletion followed by an insertion (which covers both substitution and transposition). Generation of deletion variants and the deletion-join procedure are described in more detail in examples below. Other forms of close word comparison are possible. For example, each word can have a set of close words that are "close" according to a different set of equivalent changes.

The deletion-join procedure can also use deletion variants in which multiple characters are deleted, but the number of false positives generally rises with the number of characters deleted. A false positive is when one naturally occurring ("real") word matches another naturally occurring word. For example, CLARKE and CLAIRE are related by a deletion followed by an insertion. Indeed an error could transcribe one word into the other, but because both words are real, the likelihood is that each word occurs naturally without error. Without information about which words are naturally occurring, a given fuzzy matching algorithm cannot tell directly which words are real (though there is some possibility of inferring it, as described below), so false positives can be hard for the algorithm to detect. The situation is subtle because some changes may be errors while others may not. One approach for dealing with false positives is to attach to each word a further measure, called "significance score," which initially is based on factors like the frequency with which the word appears in the data (the inverse of the word frequency count or renormalized word frequency count). For example, if one naturally occurring word is easy to mistake for another, the significance of both is reduced, reflecting loss of confidence in their distinguishability.

A potential problem with false positives is that it can lead to records which should be distinguished being reported as possible matches. One advantage of using single deletions in the deletion variants is that as the length of words increases (e.g., beyond five or so characters), the number of false positives falls rapidly as there are typically fewer long words appearing in the records, and the long words are typically more widely separated. In some implementations, the number of deletions used to generate deletion variants can depend on the length of the word. For example, for words with no more than five characters a single character is deleted, and for words with more than five characters up to two characters are deleted (e.g., the deletion variants include all words with a single character deleted and all words with two characters deleted).

The pre-execution module 110 can include features to reduce the overall computation time of large numbers of evaluations and to speed up ad hoc evaluations. The words appearing in the records and their deletion variants are stored in the dictionary 111 and the results of the deletion comparisons of the deletion-join procedure are pre-computed and stored in the archive 114, where they are available without further evaluation being required. This leverages a simple observation about name/address data: the number of words in data based on natural languages is comparatively small (e.g., <<1 million) relative to the number of records which may eventually be processed. Rather than repeat the same relatively expensive computation every time it occurs, the archive 114 stores the result (close pairs and an associated fuzzy match score) for reuse. Because the number of possible words is relatively small, and only observed variants are stored, the volume of the archive 114 is manageable.

The archive 114 has further benefits. A scoring algorithm for phrases will report a fuzzy match between words if their fuzzy match score in the archive 114 is less than a predetermined threshold (assuming a lower score indicates a higher quality match). By enabling a user to manually adjust the fuzzy match scores of word pairs in the archive 114, undesirable matches (e.g., false positives) can be turned off. Furthermore, words that would not match under the close word comparison can be added as matches in the archive 114 by adding the pair with the appropriate fuzzy match score. For example, adding the pair HSBC MIDLAND creates a fuzzy match between "HSBC BANK" and "MIDLAND BANK". This provides a method for applying synonyms based on business meaning (here, MIDLAND is a former name for HSBC). Multiword associations (like IBM for INTERNATIONAL BUSINESS MACHINES) can also be added as fuzzy matches in the archive by manually adding the entry and setting the fuzzy match score to indicate a fuzzy match. In some implementations, multiword associations are stored and/or processed separately from associations between single words. For example, in some cases, multiword associations may be used during standardization and not necessarily during phrase comparison scoring.

The matching process for words, phrases, and records generally includes identifying candidates as a potential fuzzy match and judging the quality of a match between candidates to determine actual fuzzy matches.

Matching records may involve matching words from corresponding fields, or in some cases, matching phrases of words from one or more fields. For example, since the number of words present in records from different sources when matching names or addresses needn't be the same, fuzzy matching in this context can be performed by "phrase matching." The pre-execution module 110 could choose to treat a space as an additional character, so phrases simply become longer words. When this technique is used, the pre-execution module 110 may perform additional processing to handle optional words to account for the fact that regions within the longer word with spaces treated as characters might change.

2.2 Standardization and Parsing

In some implementations of fuzzy matching, phrases are standardized before comparison. This reduces variability in predictable ways, for example, by dropping common words, like OF or THE, or by replacing common abbreviations with a full word, such as replacing CO with COMPANY. This standardization can increase the strength of matches and improve performance of the matching process in some approaches. The difficulty is that some information may be lost during the standardization, or a false identification may be introduced: CORP is likely to be an abbreviation of CORPORATION, but it could be a misspelling of CORPS.

Standardization is configurable so that in some cases standardization is not used or is held to a minimum and other mechanisms are used to handle the issues of common words and replacement of abbreviations. In some implementations, all phrases are standardized to uppercase or lowercase (while preserving character variations like accents) because case is typically inconsistent between different sources and is largely a spurious distinction. The intent is to preserve the integrity of the original data and to leave any compensation for systematic variation within a field, like abbreviations or synonyms, for later steps in the processing. The reason for this is that while a word like ST in an address field might often mean STREET, it does not always, so it is potentially troublesome to change it too soon.

Provision can be made for special treatment of punctuation characters since these are often inconsistent between sources. For example, many punctuation characters are either optional or indicate formatting in an otherwise unstructured field. Three examples of types of processing of punctuation are: replace with empty, replace with space, and replace with line break. Other forms of standardization can include replacing certain predetermined words or phrases with other words or phrases, such as replacing a word with a synonym. Users can control the replacement of punctuation and words using rules in configurable lookup files.

Parsing assigns meaning to different words or portions of phrases from any number of fields. For example, parsing may be used when handling addresses which may appear coalesced into one or two fields in some sources while they are split across eight or ten fields in other sources. Parsing fields that are expected to include known elements can be facilitated using reference sources that provide auxiliary information for identifying and validating the elements. For example, parsing address fields can be handled using postal address files (PAF files) as reference sources to identify and validate individual elements of an address.

2.3 Word Frequency and Context

The pre-execution module 110 scans the records of a given source for words appearing in the records, and, in some cases, limits the scanning to selected fields of the records. The words that occur in selected fields of the records of the given source are stored in the dictionary 111. In some implementations, each entry in the dictionary stores a word, the word's frequency, position statistics for the word, and the word's context. The frequency is a count of the number of times the word appears in the records of the source (e.g., a word may appear multiple times in a given record). The frequency can be an aggregate count over all fields or multiple counts each representing how many times the word appears in a given field. The frequency can also be renormalized as described in more detail below. If a word appears within a phrase of a given field, the position of the word in the phrase is computed for that phrase. The position statistics for a given word in the dictionary 111 include, for example, the mean and standard deviation of this position over all the phrases in which the word appeared.

A classifier called "context" is stored in the dictionary 111 to support logical groupings of fields. A user can specify contexts when the fields to be processed are selected. The use of contexts makes it possible to compare sources with dissimilar record structures, without requiring standardization to a common format. This improves the quality of comparisons between sources because source-specific information which can be deduced from the presence of words in particular fields is not lost through standardization to the common format. A given field may appear in multiple contexts, allowing both control of the granularity of comparisons and tolerance for ambiguous placement of data.

For example, an "address" context may be used to group fields that contain words that are part of an address. The field names associated with a context may differ between sources. For example, the fields address_line1, address_line2, address_line3 in one source might all be part of the address context while in another source the address context might include building_number, street, city, and postcode. Word frequency counts and significance score of a given word occurring in different fields can be aggregated to represent the frequency for the associated context.

The dictionary 111 is used for identifying the words in the archive 114 representing potential fuzzy matches and for identifying the significance of each word represented by a significance score. The dictionary 111 can be maintained using any of a variety of file formats that area efficiently accessible. For example, the dictionary 111 can be stored in an indexed compressed (concatenated) flat file format, such as the format described in U.S. application Ser. No. 11/555,458, incorporated herein by reference. The dictionary 111 can be maintained in a single file, or in multiple files, either for different purposes, sources, field encodings or for accelerating access, for example.

Other information about a word can be included in the dictionary 111. For example "importance position" is the position the word would have in the field if the words in the field were sorted in descending order by importance: this puts important words early in the phrase. For example, a phrase in the original order may be "Bank of America." The phrase with words sorted by importance may be "America Bank of." The position of the word "Bank" in the original phrase is $1^{st}$ (of 3). The importance position of the word "Bank" is $2^{nd}$ (of 3).

2.4 Fuzzy Match Score

Potential fuzzy matches of words within and between sources are pre-computed and stored in the archive 114 along with a fuzzy match score for each potential match between a pair of words that characterizes the quality of the match. Since the number of distinct words in a source is typically much less than the number of all words in the source, this pre-computation step accelerates the later comparison and scoring of fields by eliminating redundant fuzzy comparison of words. Initially only words that constitute a potential fuzzy match (according to a predetermined criterion such as the close word comparison technique) are stored in the archive 114. Users can amend and extend the archive 114 by manually adjusting fuzzy match scores or by adding match pairs that are not identified in the initial population of fuzzy match scores for words in the archive 113 based on the predetermined criterion.

In some implementations, the archive 114 is populated with fuzzy match scores using the deletion-join procedure. Rather than compute a full edit distance between each pair of words, which would be expensive computationally, only nearby words are compared in the deletion-join procedure. This is achieved in the following way. For each word in the word dictionary 111 (or for a portion of the dictionary 111, e.g., for a given source, context and/or field), every variant formed by deleting a single character is made. A "deletion set" for a given original word contains a list of entries each having key for the original word ("word_key"), the original word ("original"), the deletion variant ("deletion_var"), and the position of the character ("deletion_pos") that has been deleted from the original word. The deletion set can be stored in the dictionary 111 along with the original word, or can be discarded after being used by the pre-execution module 110 to generate the potential fuzzy matches that are stored in the archive 114. The original word is included in the deletion set along with the deletion variants and has deleted character position of 0. For example, the following is a deletion set for the word LONDON:

| word_key | deletion_pos | deletion_var | original |
|---|---|---|---|
| 1 | 0 | LONDON | LONDON |
| 1 | 1 | ONDON | LONDON |
| 1 | 2 | LNDON | LONDON |
| 1 | 3 | LODON | LONDON |
| 1 | 4 | LONDN | LONDON |
| 1 | 5 | LONDO | LONDON |

Note that word_key, deletion_pos is a unique "key" identifying a given deletion variant.

This deletion-join procedure can be extended to more deletions, recording the sequence of deletion positions, but since more than one deletion sequence can lead to the same word, the "key" for a given deletion variant is no longer unique. (There is however a canonical key determined by requiring the deletions be done in a particular order, say starting from the left in the original word, and always indicating the deletion position from the previous variant.) Thus, the deletion variant LOON generated by deleting two characters from the original word LONDON (both times in the third position) would have a deletion set entry:

| word_key | deletion_pos | deletion_var | original |
|---|---|---|---|
| 1 | 3, 3 | LOON | LONDON |

The deletion-join procedure determines potential fuzzy matches from words within one or more dictionaries by performing a join operation on the deletion_var word. The quality of the fuzzy match is scored by comparing the positions of the deleted characters. In one example of a procedure for computing a fuzzy match score points are assigned for different types of changes as follows: 1 point each for a deletion, 1 point for changing the first letter, 1 point for changing the last letter, 1 point if the characters deleted are separated by more than one position. The weight associated with each type of change is adjustable. If the deletion position of one word is 0 and the other is not, this is a single insertion or deletion. If the deletion position is the same, it is a substitution. Matches having the same word_key and deletion_pos are ignored since these are exact matches. Matches that indicate a deletion of a paired letter are also ignored as being uninformative (e.g., MEET→MET by deleting either character 2 or 3).

The following is an example of a series of selected entries from respective deletion sets for the original words LONDON, LODON, LOMDON, and LODNON.

| word_key | deletion_pos | deletion_var | original |
|---|---|---|---|
| 1 | 0 | LONDON | LONDON |
| 1 | 3 | LODON | LONDON |
| 1 | 4 | LONON | LONDON |
| 2 | 0 | LODON | LODON |
| 3 | 0 | LOMDON | LOMDON |
| 3 | 3 | LODON | LOMDON |
| 4 | 0 | LODNON | LODNON |
| 4 | 3 | LONON | LODNON |
| 4 | 4 | LODON | LODNON |

In this example, some of the deletion variant entries have been suppressed because they do not lead to interesting matches. The join operation pairs a first entry with a second entry that has the same value of deletion_var. The resulting potential fuzzy matches between pairs of original words are:

| First entry | Second entry | Potential fuzzy match |
|---|---|---|
| 1 3 LODON LONDON | 2 0 LODON LODON | LONDON LODON |
| 1 3 LODON LONDON | 3 3 LODON LOMDON | LONDON LOMDON |
| 1 3 LODON LONDON | 4 4 LODON LODNON | LONDON LODNON |
| 1 4 LONON LONDON | 4 3 LONON LODNON | LONDON LODNON |
| 2 0 LODON LODON | 3 3 LODON LOMDON | LODON LOMDON |

Respectively, the exemplary potential fuzzy matches above represent a word0-deletion, a substitution, a transposition, a transposition obtained by a different path, and a word0-insertion (or word1-deletion). Each pair of words in the archive 114 representing a potential fuzzy match has an associated fuzzy match score indicating a quality of the match.

Using the procedure described above, the fuzzy match scores for these pairs are as follows:

| Potential fuzzy match | Fuzzy match score |
|---|---|
| LONDON LODON | 1 |
| LONDON LOMDON | 1 |
| LONDON LODNON | 2 |
| LONDON LODNON | 2 |
| LODON LOMDON | 1 |

As another example of scoring a pair identified as a potential fuzzy match, the words ONDOON and LONDON would have a fuzzy match score of 4 (1 for first letter, 1 for deleting L, 1 for deleting O, 1 for non-adjacent deletions.

The join operation can be performed on a dictionary 111 with words from any number of sources including a single source. In some cases, the dictionary 111 includes a section with words from a first source (source0) and a section with words from a second source (source1). The deletion-join procedure can be performed using selected sources and the results can be stored in the archive 114 along with an indication of which sources were selected and other information such as in what order they were compared.

For example, each pair of words in the archive 114 representing a potential fuzzy match can also be associated with an entry_descriptor. The entry_descriptor can be implemented as a bit-mapped field which indicates the origin of the pair. One bit indicates that the pair was produced by a graph using this deletion-join method. Other bits indicate whether the score has been modified by a user, whether the pair has been inserted by a user (e.g., to introduce synonyms), or whether the pair was generated by cleansing of embedded punctuation characters (called "cleansed").

Cleansing of punctuation characters (potentially including foreign-language diacriticals) arises because experience shows that multiple punctuation characters can occur embedded within a single word. Sometimes these are effectively optional, like periods in initials; sometimes they look like trailing garbage characters. Since more than one character is often involved, such cleansings would not be picked up by the single-deletion method while multiple deletions would bring in too many false positives. The following are a couple of examples of cleansed words:

| original word | cleansed word |
| --- | --- |
| S.I.ID. | SIID |
| HOLDINGS### | HOLDINGS |

Words from a single source can be scored against each other. When there is more than one source, words from each source can be scored against those of other sources (e.g., independent of field or context). This identifies potential fuzzy matches that may not occur within the source itself. Since misspellings and typographical errors are relatively isolated events, they typically vary across sources.

The archive 114 can store potential fuzzy match results across all sources, for example, in an indexed compressed (concatenated) flat file format such as the format described in U.S. application Ser. No. 11/555,458, incorporated herein by reference. The use of multiple archives 114, both in multifile format and for different purposes, is possible (e.g., for the multiword scores described below). As new sources are brought in, the words are scored against their own deletion sets added to the dictionary 111 and against existing deletion sets already in the dictionary 111. New potential fuzzy match pairs and scores can be concatenated to the end of the existing archive 114 in sorted order. A later merge process can reorganize the archive for performance.

In some implementations, if an entry in the archive 114 for a word pair is already present, the pair is discarded and not scored again. This may be done, for example, for performance and to allow users to modify the score produced by the deletion-join procedure. Since the archive 114 is cumulative, the number of words that need to be scored declines over time as the body of observed pairs grows.

Modifying the score of an entry is useful to turn off false positives individually. Components of computation graphs are able to use the scores in the archive 114 to determine whether a word pair is a fuzzy match based on whether their score in the score archive is below a given threshold. Raising the score for a given pair of words in the archive 114 above the threshold effectively turns the match off (indicating that the identified potential fuzzy match is not an actual fuzzy match). Judicious scoring of word pairs makes it possible to selectively turn on and off sets of words by adjusting the threshold. In some implementations, one or more thresholds are configured to depend on context, and the score for a given pair can also depend on context (e.g., using additional information stored in the archive 114).

Users can also add word pairs to the archive 114 that would not be identified in the deletion-join procedure. This is useful for adding synonyms or abbreviations to the score archive. For example, STREET and ST would not be identified as a potential fuzzy match by the deletion-join procedure, but this may be an identification that is desirable. It is also possible to add nickname identifications like ROBERT and BOB (this is a natural example of a context-dependent score—these might be considered a match in a personal name context but not in other contexts).

The fuzzy match scores in the archive can be updated by feedback from the results of further processing (e.g., accepted matches between phrases in which those words appear).

2.5 Word Frequency Renormalization and Significance Score

After the archive 114 is populated with at least some word pairs, it can be used to "renormalize" the word frequency counts in the dictionary 111. The frequency of each word is adjusted by adding the counts of all words that are related to that word as a potential fuzzy match. The resulting renormalized frequency is used to compute the "significance score" of a word, which in turn will be used when matching phrases. The less frequent a word is in the data, the more significant it is in the sense that it is distinguishable from other words.

The difficulty with applying the frequency concept of significance to the raw word frequency counts is illustrated by misspelled words. Misspellings are rare and therefore are disproportionately significant. By adjusting their counts with the count of the more frequently occurring words they match with, their true relative significance is brought out. The high frequency matching words should not necessarily be thought of as "correctly spelled" because this implies a correctness to the matching word which may not apply. Not all low frequency words are misspelled and not all matching high frequency words are the corrected spelling even of misspelled words. For example, NORTE may be a misspelling of NORTH or it may simply be north in Spanish. LABLE might be a misspelling of LABEL but it could also be a misspelling of TABLE—both will occur as high frequency matches.

Significance carries a strong connotation of distinguishability. If a word matches with multiple high frequency words, as LABLE does, it is considered less significant because there is greater scope for it to be mistaken for another word.

In the archive 114, the renormalized word frequency count can be stored and other information such as a list of the words used to perform the renormalization (e.g., for diagnostic purposes). The following are examples of words that are potential fuzzy matches to the word AVENUE, along with an exemplary phrase showing the context in which the word appears, and a count of the number of times the word appears in an exemplary data source. In this exemplary data source, the word AVENUE itself occurs 10,500 times.

| word | context | count |
| --- | --- | --- |
| AVENE | 237 Park Avene | 1 |
| AVNENUE | 255 5th Avnenue SW | 1 |
| AVENUNE | 306 MAROON AVENUNE | 2 |
| AVEUNUE | 236 TATE AVEUNUE | 1 |
| AVENUES | Philadelphia & Reading Avenues | 11 |
| AVENUUE | 57 NORTH TWELFTH AVENUUE | 1 |
| AVENUS | 1900 9th Avenus | 1 |
| AVEUNE | 1010 BELLEVERNON AVEUNE | 4 |
| AVENIE | 3401 Hillview Avenie | 1 |

-continued

| word | context | count |
|---|---|---|
| AVNUE | 540 GODDARD AVNUE | 1 |
| AVEBUE | 10319 FIRMONA AVEBUE | 1 |
| AVENYE | 132 JEFFERSON AVENYE | 1 |
| VENUE | 725 North Mathilda Venue | 1 |
| ANENUE | 3330 Evergreen Anenue | 1 |
| VENDUE | ZI LA VENDUE | 1 |
| AVENUE. | 5200 NW 33rd Avenue. Suite 215 | 1 |

The word AVENUE would show as having 16 potential fuzzy matches and the count of 10500 would be adjusted by the sum of the counts of those matched words. Each of these matched words would have their counts adjusted by the 10500 associated with AVENUE plus any other words identified as a potential fuzzy match to that matched word. Typically, misspelled words link with fewer fuzzy matches than correctly spelled words.

The process by which a word's frequency count is renormalized is illustrated in the following example. In this example, a dictionary for source0 includes the words MÉXICO (original frequency count of 11) and MEXICO (original frequency count of 259) which appear in a field called "legal_address," and a dictionary for source1 includes the words MEXCIO (original frequency count of 2) and MEXICO (original frequency count of 311) which appear in a field called "taddress3" (note the accented E in source0).

In this example, the pairs of words stored in the archive 114 include potential fuzzy matches between source0 and source1 based on a join operation between the deletion sets of the dictionary for source0 and the deletion sets of the dictionary for source1. (The following example below will augment the archive with the potential fuzzy matches from a self-join of the deletion sets for each source.) So the following two pairs of potential fuzzy matches occur in the archive 114:
   MÉXICO MEXICO
   MEXICO MEXCIO An example of the renormalization process is as follows. The dictionaries for both source0 and source1 are processed, for example, starting with the word MÉXICO in source0. This word is looked up in the archive 114 to find the list of potential fuzzy matches occurring in source1. Each potential fuzzy match is then looked up in the original dictionary for source0. The resulting counts are added to the original count. This process applied to the example above yields the following results for renormalization of the word frequency counts in the dictionary for source0:
   first input word and original count from source0: MÉXICO 11
   look up in archive, return {MEXICO}
   look up each in source0 dictionary, add counts:
      source0: MEXICO 259
      found: {MEXICO}
      renormalized count for MÉXICO=11+259=270
   second input word and original count from source0: MEXICO 259
   look up in archive, return {MÉXICO,MEXCIO}
   look up each in source0 dictionary, add counts:
      source0: MÉXICO 11
      source0: MEXCIO not found
      found: {MÉXICO}
      renormalized count for MEXICO=259+11=270

Suppose there were an additional entry in the source0 dictionary for the word MÉXICA with an original word frequency count of 5.

This word MÉXICA does not have a potential fuzzy match to anything in source1, so it does not appear in the archive 114 and therefore will not participate in the renormalization for source0 (relative to source1). If, however, the archive 114 has been extended with the self-join on deletion sets for the source0 dictionary with this additional entry, there would be the following additional entry in the archive 114:
   MÉXICA MÉXICO The lookup on the first word MÉXICO would then add MÉXICA to the set of found potential fuzzy matches. The renormalization for MÉXICO would then be performed as follows:
   source0: MEXICO 259
   source0: MÉXICA 5
   found: {MÉXICA,MEXICO}
   renormalized count for MÉXICO=11+5+259=275

The renormalized word frequency count is now higher, reflecting the presence of the additional potential fuzzy match MÉXICA. The significance score calculated based on the renormalized word frequency counts is then calculated, for example, as the log of the total number of non-empty records divided by the renormalized word frequency count. In this version of the significance score, the more frequently a word and its variants occur, the lower the significance score. A negative value indicates that a word occurs more often than once per record.

The renormalized word frequency counts can be used to identify likely misspellings or conversely likely false positives. Simply put, misspellings are expected to be rare while false positives are not. A simple ratio test indicates which words have counts much less than the renormalized word frequency count. These are likely misspellings. Even higher confidence might be achievable if ngram frequencies were consulted. An ngram is an n-letter word fragment. The frequency distribution of ngrams across the full data indicates the frequency of occurrence of the different letter combinations. (This distribution is of course language-specific.) The idea is that during production of the archive, the location of the change between two words is known. The two-letter and three-letter (and higher) word fragments spanning the location of the change can be identified and their frequencies looked up. If the ngram frequencies associated with the change in one word are much lower than in the other, this indicates the former word is likely misspelled.

On the other hand, multiple variants each with relatively high counts are likely to be naturally occurring variants—that is, false positives. From the standpoint of scoring, the existence of false positive matches reduces the significance of a word by adding relatively larger counts to it. In some cases, this may be desirable because it indicates the words could be mistaken. In other cases however, the words are so dissimilar looking that it is unlikely an error produced them—certainly not at the level of the relative counts.

Significance can be truly relative. When multiple sources are involved, some potential fuzzy match words may not occur in all sources. This means that adjusted counts can vary between sources. Similarly, the field or context associated with a word may be relevant. Which adjustments are made can be adapted to the pairing of sources, fields, and contexts, for example. In the relative case, only potential fuzzy matches that actually occur in the appropriate source/field/context when two sources are compared would be used to adjust the counts. It is expected the contribution from source-specific variants would generally be a small effect.

2.6 Encoding

The close words found in the deletion-join procedure are based on the arrangement of characters in words essentially unaltered from their appearance in the original dataset. The close word comparison can also be carried out in a "space of words" that is altered by using "word encodings." The set of close that are found may be different when word encodings are used. A word encoding maps words to a new representation. The mapping can be one-to-one, one-to-many, or many-to-one. Some encodings may transform a word to a different character set, and some encodings may transform a word to a numerical representation. A word encoding modifies the space of words so that distances between words according to a given metric may change. Words that may not have been close in terms of their natural character representations may be close after a word encoding is applied.

For example, in some implementations, the pre-execution module 110 performs a "prime encoding" in which each character in the character set is encoded as a prime number (e.g., with each letter in the alphabet being mapped to a different prime number, ignoring case) and the encoded word is the product of the prime numbers of the characters. Because multiplication is commutative (i.e., independent of the order of the factors), two encoded words are the same providing they consist of the same set of characters, irrespective of their order. This encoding is insensitive to transposition or indeed to scrambling, and is an example of a many-to-one mapping.

For a given encoding, a variation of the deletion-join procedure can perform deletion of a character before the encoding to generate close words, or can perform a close-word-operation after the encoding to generate close words. A variation of the deletion-join procedure for the prime encoding can be performed in which the module 110 divides the encoded product by a prime number to delete a corresponding character in a deletion variant. For some encodings (like the prime encoding), the close-word-operation after encoding yields the same result as if character deletion had taken place before encoding, but for other encodings, the close-word-operation may yield a different result than if character deletion had taken place before encoding.

For some languages, like Japanese, which use multiple alphabets or character sets (e.g., computer byte codes that identify characters), the encoding may include standardizing the choice of alphabet or character set before encoding.

2.7 Multiwords

A multiword is a phrase containing embedded spaces treated as a word. In previous examples, phrases have been parsed into words without embedded spaces before scoring. This overlooks two potential sources of errors: spaces can be inserted within a word and the space between words can be dropped. Another example is handling synonyms relating a phrase to a single word, like an acronym.

To allow embedded spaces is to weaken the identification of space as a separator. This is done by extending the parsing of a phrase to contain not only single words, but also all adjacent pairs and triples, etc., of words. The phrase is decomposed into all of its subphrases (multiwords) shorter than a specified length. All of the embedded spaces within a multiword (mword), are deleted to form the concatenated-word (cword). This is the analog of a word formed by deletion. The cword becomes the key for the multiword dictionary and the multiword archive. When multiwords are compared, their cwords are matched and then the original mwords scored. For now, the possibility of misspelled words within an mword are ignored. To treat this case, the archive is consulted when scoring the mword pairs.

As an example, consider a source with the following three names
JOHN A SMITH
JO HNA SMITH
JOHNA SMITH An mword decomposition of the first entry to length 3 would give the set of mwords: {JOHN, A, SMITH, JOHN A, A SMITH, JOHN A SMITH}.

3 Implementations

The approximate string matching approach described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and pre-defined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing an archive for determining approximate matches associated with strings occurring in records, the method including:
   determining a set of strings occurring in the records, the set of strings including a first string;
   generating, for each of the strings in the set, a plurality of deletion variants that are each generated by deleting one or more characters from the corresponding string;
   for the first string, identifying one or more potentially matching strings in the set of strings, each potentially matching string of the potentially matching strings identified in response to determining that any deletion variant of the first string matches any deletion variant of the potentially matching string;

for each of the potentially matching strings, calculating a corresponding match score;

for at least some of the potentially matching strings, storing a record in the archive identifying the first string, the potentially matching string, and the match score;

determining a count of occurrences of the first string in the records;

for each of the potentially matching strings, determining a count of occurrences of the respective potentially matching string in the records; and generating a significance value for the first string based on a sum of at least the count of occurrences of the string and the count of occurrences of each of the one or more potentially matching strings.

2. The method of claim 1, wherein generating the plurality of deletion variants for a given string in the set includes generating deletion variants that each have a different character deleted from the given string.

3. The method of claim 2, wherein generating the plurality of deletion variants for a given string in the set includes generating deletion variants that each have a single character deleted from the given string.

4. The method of claim 3, wherein generating the plurality of deletion variants for a given string in the set includes generating deletion variants at least some of which have multiple characters deleted from the given string.

5. The method of claim 2, wherein generating deletion variants that each have a different character deleted from the given string includes generating deletion variants that each have a single character deleted from the given string if the given string is shorter than a predetermined length, and generating deletion variants at least some of which have multiple characters deleted from the given string if the given string is longer than the predetermined length.

6. The method of claim 1, wherein the significance value is based on an inverse of the sum.

7. The method of claim 1, further including determining whether different phrases that include multiple strings correspond to an approximate match by determining whether strings within the phrases correspond to an approximate match, wherein the strings within the phrases are selected based on their corresponding significance values.

8. The method of claim 7, wherein the significance value of a string within a phrase is based on the sum, and is based on at least one of a length of the string, a position of the string in the phrase, a field of a record in which the string occurs, and a source of a record in which the field occurs.

9. The method of claim 1, further including generating, for each of at least some of the potentially matching strings, a score that quantifies a quality of the potential approximate match between the first string and the respective potentially matching string.

10. The method of claim 9, further including determining whether the first string and the respective potentially matching string are an approximate match by comparing the score associated with the entry to a threshold.

11. The method of claim 9, wherein the score is based on a correspondence between the respective deletion variants used to determine the potential approximate match between the first string and the respective potentially matching string.

12. The method of claim 9, further including identifying potential approximate matches which are probable false positives.

13. The method of claim 12, wherein a probable false positive potential approximate match between the first string and a second string of the potentially matching strings is identified based on a frequency of occurrence of the first string in the records and a frequency of occurrence of the second string in the records.

14. The method of claim 12, wherein a probable false positive potential approximate match is identified based on n-gram frequencies.

15. The method of claim 12, further including adjusting the score associated with the entry representing a potential approximate match in response to identification of the potential approximate match as a probable false positive.

16. The method of claim 1, further including modifying a string occurring in at least one record to generate a modified string to include in the set of strings.

17. The method of claim 16, wherein modifying the string includes removing or replacing punctuation.

18. The method of claim 16, wherein modifying the string includes encoding the string into a different representation.

19. The method of claim 18, wherein modifying the string includes encoding the string into a numerical representation.

20. The method of claim 19, wherein encoding the string into a numerical representation includes mapping each character in the string to a prime number and representing the string as the product of the prime numbers mapped to the characters in the string.

21. The method of claim 1, wherein the generating the significance value for the first string includes calculating the inverse of the sum of:

the frequency of occurrence of the corresponding string in the records, and the frequency of occurrence of a string represented in the archive as a potential approximate match to the corresponding string in the records.

22. A computer program, stored on a non-transitory computer-readable medium, for managing an archive for determining approximate matches associated with strings occurring in records, the computer program including instructions for causing a computer to:

determine a set of s strings occurring in the records, the set of strings including a first string;

generate, for each of the strings in the set, a plurality of deletion variants that are each generated by deleting one or more characters from the corresponding string;

for the first string, identify one or more potentially matching strings in the set of strings, each potentially matching string of the potentially matching strings identified in response to determining that any deletion variant of the first string matches any deletion variant of the potentially matching string;

for each of the potentially matching strings, calculate a corresponding match score;

for at least some of the potentially matching strings, store a record in the archive identifying the first string, the potentially matching string, and the match score;

determine a count of occurrences of the first string in the records;

for each of the potentially matching strings, determine a count of occurrences of the respective potentially matching string in the records; and generate a significance value for the first string based on a sum of at least the count of occurrences of the string and the count of occurrences of each of the one or more potentially matching strings.

23. The computer program of claim 22, wherein generating the plurality of deletion variants for a given string in the set includes generating deletion variants that each have a different character deleted from the given string.

24. The computer program of claim 23, wherein generating the plurality of deletion variants for a given string in the set includes generating deletion variants that each have a single character deleted from the given string.

25. The computer program of claim 24, wherein generating the plurality of deletion variants for a given string in the set includes generating deletion variants at least some of which have multiple characters deleted from the given string.

26. The computer program of claim 23, wherein generating deletion variants that each have a different character deleted from the given string includes generating deletion variants that each have a single character deleted from the given string if the given string is shorter than a predetermined length, and generating deletion variants at least some of which have multiple characters deleted from the given string if the given string is longer than the predetermined length.

27. The computer program of claim 22, wherein the significance value is based on an inverse of the sum.

28. The computer program of claim 22, further including determining whether different phrases that include multiple strings correspond to an approximate match by determining whether strings within the phrases correspond to an approximate match, wherein the strings within the phrases are selected based on their corresponding significance values.

29. The computer program of claim 28, wherein the significance value of a string within a phrase is based on the sum, and is based on least one of a length of the string, a position of the string in the phrase, a field of a record in which the string occurs, and a source of a record in which the field occurs.

30. A system for managing an archive for determining approximate matches associated with strings occurring in records, the system including:
  means for determining a set strings occurring in the records, the set of strings including a first string;
  means for generating, for each of the strings in the set, a plurality of deletion variants that are each generated by deleting one or more characters from the corresponding string;
  means for identifying, for the first string, one or more potentially matching strings in the set of strings, each potentially matching string of the potentially matching strings identified in response to determining that any deletion variant of the first string matches any deletion variant of the potentially matching string;
  means for calculating, for each of the potentially matching strings, a corresponding match score;
  means for storing, for at least some of the potentially matching strings, a record in the archive identifying the first string, the potentially matching string, and the match score;
  means for determining a count of occurrences of the first string in the records;
  means for determining, for each of the potentially matching strings, a count of occurrences of the respective potentially matching string in the records; and
  means for generating a significance value for the first string based on a sum of at least the count of occurrences of the string and the count of occurrences of each of the one or more potentially matching strings.

31. The system of claim 30, wherein generating the plurality of deletion variants for a given string in the set includes generating deletion variants that each have a different character deleted from the given string.

32. The system of claim 31, wherein generating the plurality of deletion variants for a given string in the set includes generating deletion variants that each have a single character deleted from the given string.

33. The system of claim 32, wherein generating the plurality of deletion variants for a given string in the set includes generating deletion variants at least some of which have multiple characters deleted from the given string.

34. The system of claim 31, wherein generating deletion variants that each have a different character deleted from the given string includes generating deletion variants that each have a single character deleted from the given string if the given string is shorter than a predetermined length, and generating deletion variants at least some of which have multiple characters deleted from the given string if the given string is longer than the predetermined length.

35. The system of claim 30, wherein the significance value is based on an inverse of the sum.

36. The system of claim 30, further including determining whether different phrases that include multiple strings correspond to an approximate match by determining whether strings within the phrases correspond to an approximate match, wherein the strings within the phrases are selected based on their corresponding significance values.

37. The system of claim 36, wherein the significance value of a string within a phrase is based on the sum, and is based on least one of a length of the string, a position of the string in the phrase, a field of a record in which the string occurs, and a source of a record in which the field occurs.

38. A system for managing an archive for determining approximate matches associated with strings occurring in records, the system including:
  a data source storing records;
  a computer system configured to
  determine a set of strings occurring in the records, the set of strings including a first string;
  generate, for each of the strings in the set, a plurality of deletion variants that are each generated by deleting one or more characters from the corresponding string;
  for the first string, identify one or more potentially matching strings in the set of strings, each potentially matching string of the potentially matching strings identified in response to determining that any deletion variant of the first string matches any deletion variant of the potentially matching string;
  for each of the potentially matching strings, calculate a corresponding match score;
  for at least some of the potentially matching strings, store a record in the archive identifying the first string, the potentially matching string, and the match score;
  determine a count of occurrences of the first string in the records;
  determine, for each of the potentially matching strings, a count of occurrences of the respective potentially matching string in the records; and
  generate a significance value for the first string based on a sum of at least the count of occurrences of the string and the count of occurrences of each of the one or more potentially matching strings; and
  a data store coupled to the computer system to store an archive including entries that each represent a potential approximate match between at least two strings.

39. The system of claim 38, wherein generating the plurality of deletion variants for a given string in the set includes generating deletion variants that each have a different character deleted from the given string.

40. The system of claim 39, wherein generating the plurality of deletion variants for a given string in the set includes generating deletion variants that each have a single character deleted from the given string.

41. The system of claim 40, wherein generating the plurality of deletion variants for a given string in the set includes generating deletion variants at least some of which have multiple characters deleted from the given string.

42. The system of claim 39, wherein generating deletion variants that each have a different character deleted from the given string includes generating deletion variants that each have a single character deleted from the given string if the given string is shorter than a predetermined length, and generating deletion variants at least some of which have multiple characters deleted from the given string if the given string is longer than the predetermined length.

43. The system of claim 38, wherein the significance value is based on an inverse of the sum.

44. The system of claim 38, further including determining whether different phrases that include multiple strings correspond to an approximate match by determining whether strings within the phrases correspond to an approximate match, wherein the strings within the phrases are selected based on their corresponding significance values.

45. The system of claim 44, wherein the significance value of a string within a phrase is based on the sum, and is based on least one of a length of the string, a position of the string in the phrase, a field of a record in which the string occurs, and a source of a record in which the field occurs.

* * * * *

UNITED STATES PATENT AND TRADEMARK OFFICE
CERTIFICATE OF CORRECTION

PATENT NO. : 8,775,441 B2
APPLICATION NO. : 12/015085
DATED : July 8, 2014
INVENTOR(S) : Arlen Anderson It is certified that error appears in the above-identified patent and that said Letters Patent is hereby corrected as shown below:

In the Claims

Claim 22, col. 22, line 39, after "of" delete "s"

Claim 29, col. 23, line 27, delete "least" and insert -- at least --

Claim 30, col. 23, line 33, after "set" insert -- of --

Claim 37, col. 24, line 24, delete "least" insert -- at least --

Claim 45, col. 25, line 23, delete "least" and insert -- at least --

Signed and Sealed this
Seventh Day of October, 2014

Michelle K. Lee
*Deputy Director of the United States Patent and Trademark Office*